Patented June 29, 1948

2,444,023

UNITED STATES PATENT OFFICE 2,444,023

PREPARATION OF DIMETHYL UREA

August H. Homeyer, Webster Groves, Mo., assignor to Mallinckrodt Chemical Works, St. Louis, Mo., a corporation of Missouri No Drawing. Application November 18, 1946, Serial No. 710,413

7 Claims. (Cl. 260—553)

This invention relates to the preparation of ureas and more particularly to the preparation of dimethyl urea.

Among the objects of this invention are the provision of efficient methods for preparing dimethyl urea; the provision of methods of the type indicated which may be easily carried out; the provision of methods of the type referred to which utilize relatively inexpensive reaction media; and the provision of methods of the type indicated which produce a high yield of dimethyl urea. Other objects will be in part apparent and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Dimethyl urea has been previously prepared in most instances by the reaction of methyl amine and phosgene using immiscible solvents. For example, the methyl amine is frequently dissolved in an aqueous medium and then mixed with a solution of phosgene in a solvent such as benzene or toluene. Although the reaction takes place, the reaction media being nonmiscible the reaction is more difficult to carry out, since the handling of a solution of phosgene in an organic solvent is not simple. Moreover, the expense of the reaction media is relatively greater than the expense involved with the reaction media of the present invention.

The employment of an organic solvent has heretofore been considered absolutely essential. Because of the well-known reactivity of phosgene with water, it has been heretofore believed impossible to cause phosgene to react in any great proportion with an amine in an aqueous solution. In an aqueous solution it would have been predicted that the phosgene would react preferentially with the water.

In accordance with the present invention I have made the surprising discovery that the reaction of methyl amine and phosgene to form dimethyl urea, in the presence of a caustic alkali, such as sodium or potassium hydroxide,

may be easily carried out in a single aqueous medium. The methyl amine is merely dissolved in the aqueous medium, which may be water or water containing one or more inert components. The phosgene is slowly added as such by merely adding it to the methyl amine solution. Contrary to the teachings of the art I have found that it is not necessary to dissolve the phosgene in a vehicle or solvent, but that the reaction easily takes place with high yields where the phosgene is merely added to an aqueous solution of methyl amine.

In this way, the obvious difficulties of handling a solution of phosgene in an organic solvent are avoided, and, although such a solution affords a means for controlling the reaction, it has been found that the reaction may be effectively controlled in other ways to utilize the advantages of the present invention.

The following examples illustrate the invention:

Example 1

A twenty-gallon, jacketed, glass-lined kettle, fitted with an efficient stirrer, thermometer, an inlet tube arranged for delivery of phosgene below the surface of the liquor, and provided with an inlet for the addition of measured amounts of sodium hydroxide solution was employed. Cold water was circulated through the jacket to control the temperature of the reaction mixture. The kettle was charged with an aqueous methyl amine solution (55.1 pounds) of 34.3% concentration. A phosgene cylinder was arranged on a scale and connected to the inlet tube through valves to control the rate of flow. Sodium hydroxide solution (7.55 gallons), 9.7 normal, was placed in a calibrated tank and connected through a valve to the inlet tube. Phosgene was admitted to the well-stirred reaction mixture at the rate of about five pounds per hour. The cooling water was circulated through the jacket to keep the reaction mixture at about 18° C. After several pounds of phosgene had been admitted, the gradual addition of sodium hydroxide solution was begun and maintained at such a rate that at no time was there an excess of sodium hydroxide present over the amount necessary to react with the chloride produced by the reaction of the phosgene with methyl amine. The rate of addition of phosgene was balanced against the cooling provided by the circulation of water so that the temperature was maintained constant at about 18° C. After about 80% of the theoretical amount of phosgene had been introduced at a maximum rate of about five pounds per hour, the rate of addition was decreased somewhat and the last part of the reaction was conducted at a lower temperature. The total amount of phosgene added was 29.4 pounds, or 98% of the theoretical. The rate of addition of the sodium hydroxide solution was adjusted so that it exactly balanced the proportion of phosgene at the end of the reaction.

The reaction product consisted of a solution of dimethyl urea containing some sodium chloride in suspension. The reaction mixture weighed 155 pounds and analysis showed that it contained 24 pounds of dimethyl urea having a freezing point of 101° C. This corresponds to a yield of 90% of theoretical based on the methyl amine used as starting material. It was found further that the reaction mixture contained about 10% of unreacted methyl amine which could be recovered and re-used by appropriate procedures. Taking into account the recovered methyl amine, the yield of dimethyl urea was practically theoretical.

For the recovery of dimethyl urea, the solution may be concentrated and freed of water as by heating under reduced pressure. The dry mixture may be extracted with a hot solvent, such as chloroform, benzene, or anhydrous alcohol, to separate the dimethyl urea from the salt. The dimethyl urea may be recovered from the solvent by volatilizing the solvent or by crystallizing under appropriate conditions.

Example 2

Materials were combined in the same manner and proportions as described in Example 1 except that the temperature of the reaction was maintained at 30–35° C. and an excess of phosgene amounting to 5.5% was employed. The product was shown by analysis to contain 81% of the theoretical amount of dimethyl urea and 14% of unreacted methyl amine. The dimethyl urea was contaminated by by-products so that the crude material had a freezing point of 89.9° C. The dimethyl urea can be recovered as described in Example 1, but the crude product obtained under these conditions usually was less pure.

Example 3

Example 1 was repeated but, in lieu of the aqueous methyl amine solution, the kettle was charged with water, and methyl amine in gaseous form was delivered below the surface of the water at the rate of about five pounds per hour through another inlet tube. Comparable results were obtained.

As indicated in the examples, effective agitation should be employed, since otherwise the yields obtained are lower. This agitation serves to prevent undesired local concentration and thereby to avoid side reactions. Moreover, effective stirring prevents overheating and aids heat transfer to control the temperature so that it is not substantially above 50° C.

It is preferred that the reaction mixture be maintained at a temperature of approximately 18° C. Lower temperatures are not detrimental and even higher temperatures up to as high as 50° C. may be employed, although in general increasing the temperature substantially above 18° C. deleteriously affects the yield and quality of the product.

In general it is preferred that not more than a theoretical proportion of phosgene be used, since an excess tends to promote side reactions. Satisfactory results can be obtained by using less than a theoretical amount of phosgene. For example, excellent results are obtained with 90% of theoretical.

The caustic should be added at such a rate that it is consumed as it is added; that is, the rate of addition is controlled so that at no time during the reaction is there an excess of caustic present. Preferably, the reaction is permitted to occur to the extent of about 10–25% before the addition of the caustic is begun. It may be added continuously as the reaction takes place, or periodic additions of caustic may be made as desired.

The aqueous methyl amine solution is preferably of a concentration of about 35% by weight. However, more concentrated or more dilute solutions may be employed, although in general it is preferred that the concentration not be substantially below 10% or above 50%.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

I claim:

1. The method of preparing dimethyl urea which comprises reacting methyl amine and not substantially in excess of the theoretical proportion of phosgene in an aqueous medium and adding a caustic alkali to the aqueous solution.

2. The method of preparing dimethyl urea which comprises mixing not substantially in excess of the theoretical proportion of gaseous phosgene and an aqueous solution of methyl amine and adding a caustic alkali to the aqueous solution.

3. The method of making dimethyl urea which comprises bubbling not substantially in excess of the theoretical proportion of gaseous phosgene into an aqueous solution of methyl amine and adding a caustic alkali to the aqueous solution.

4. The method of making dimethyl urea which comprises mixing not substantially in excess of the theoretical proportion of gaseous phosgene with an aqueous solution of methyl amine and neutralizing the acid formed by the reaction by adding a caustic alkali to the reaction mixture.

5. The method of making dimethyl urea which comprises bubbling not substantially in excess of the theoretical proportion of phosgene into an aqueous solution of methyl amine and simultaneously neutralizing the acid formed by the reaction by adding a caustic alkali.

6. The method of making dimethyl urea which comprises mixing together phosgene and an aqueous solution of methyl amine, said phosgene being added in not substantially more than the theoretical proportion and said mixing being carried out at a temperature not substantially above 50° C., while agitating the mixture, and neutralizing the acid formed by the reaction by adding to the reaction mixture while the reaction is taking place a caustic alkali at such a rate that at no time during the progress of the reaction is there a substantial excess of caustic present.

7. The method of making dimethyl urea which comprises simultaneously introducing into an aqueous medium, gaseous phosgene and methyl amine, said phosgene being introduced in not substantially more than the theoretical proportion, maintaining the aqueous medium at a temperature not substantially above 50° C. and adding a caustic alkali to the aqueous medium at such a rate that at no time during the progress of the reaction is there a substantial excess of caustic present.

AUGUST H. HOMEYER.

REFERENCES CITED

The following references are of record in the file of this patent:

UNITED STATES PATENTS

| Number | Name | Date |
|---|---|---|
| 1,393,597 | Albert | Oct. 11, 1921 |
| 1,670,850 | Everatt et al. | May 22, 1928 |
| 2,146,209 | Graves | Feb. 7, 1939 |

OTHER REFERENCES

Marckwald, "Ber. Deut. Chem.," vol. 23, page 3207 (1890).